May 13, 1924.
S. VIOLETTE
AUTOMATIC SAWING MACHINE
Filed Nov. 18, 1922
1,493,831
6 Sheets-Sheet 1
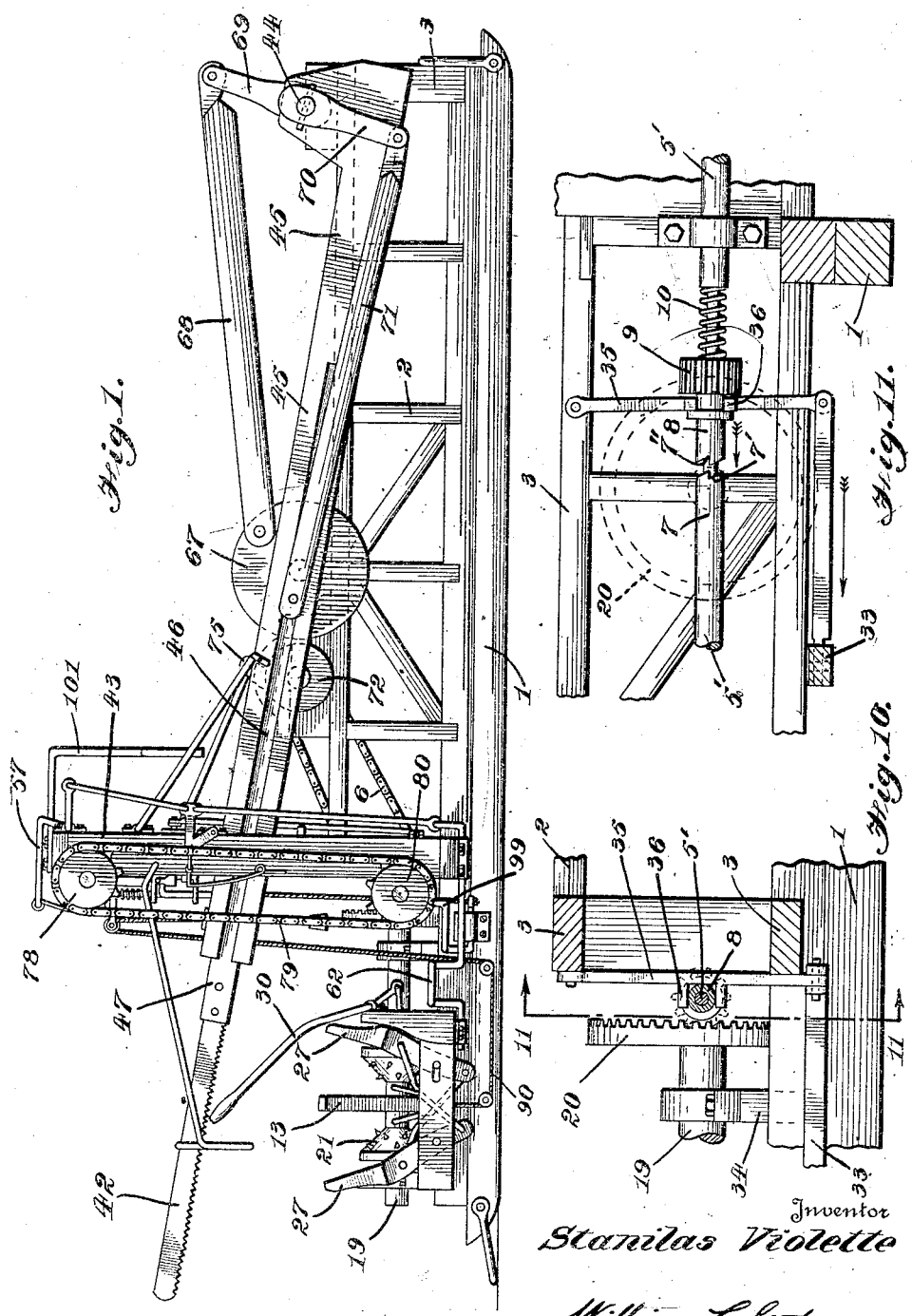
Inventor
Stanilas Violette
By William C Sinton
Attorney May 13, 1924.
S. VIOLETTE
AUTOMATIC SAWING MACHINE
Filed Nov. 18, 1922        6 Sheets-Sheet 2
1,493,831
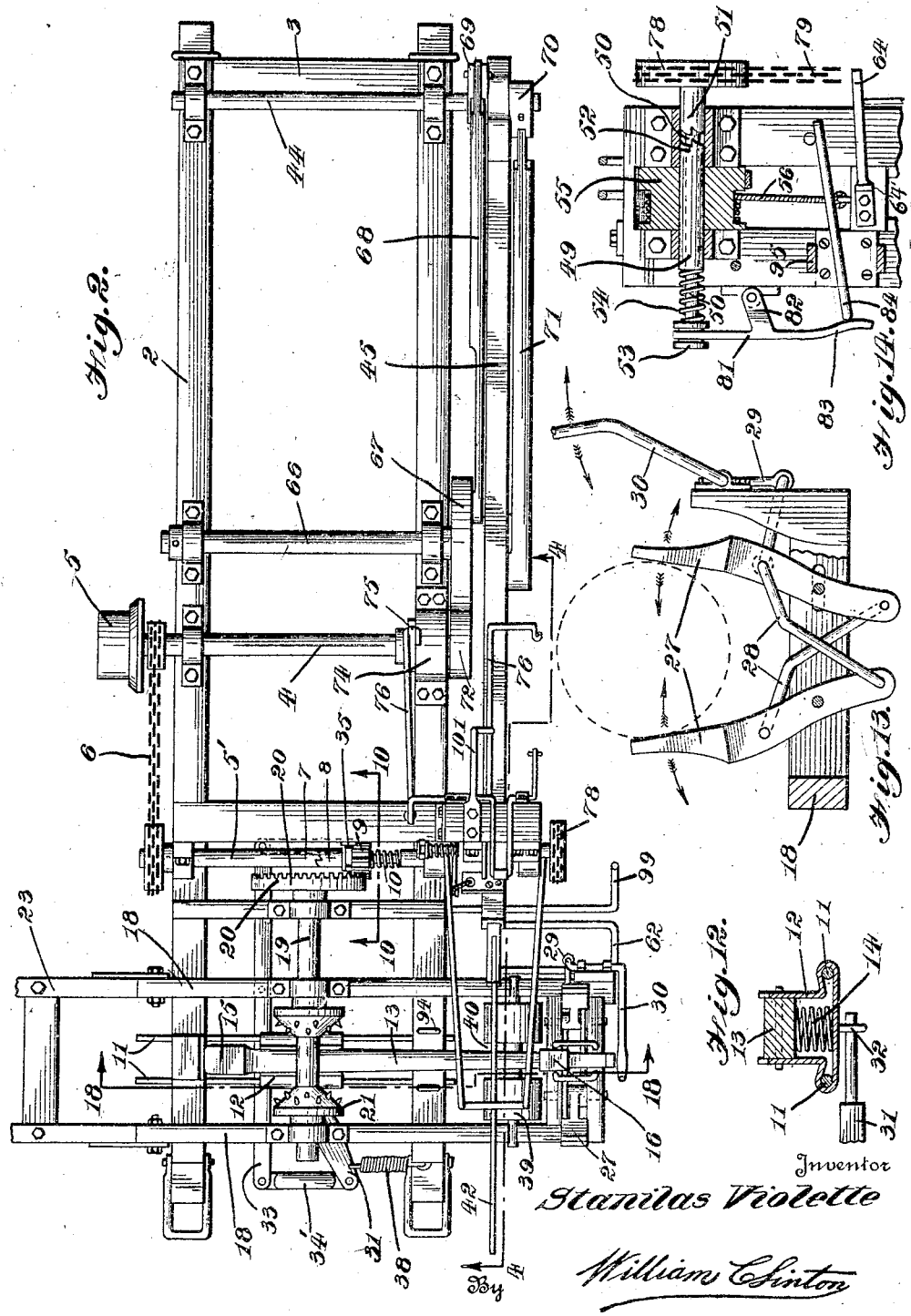
Inventor
Stanilas Violette
William Clinton
Attorney

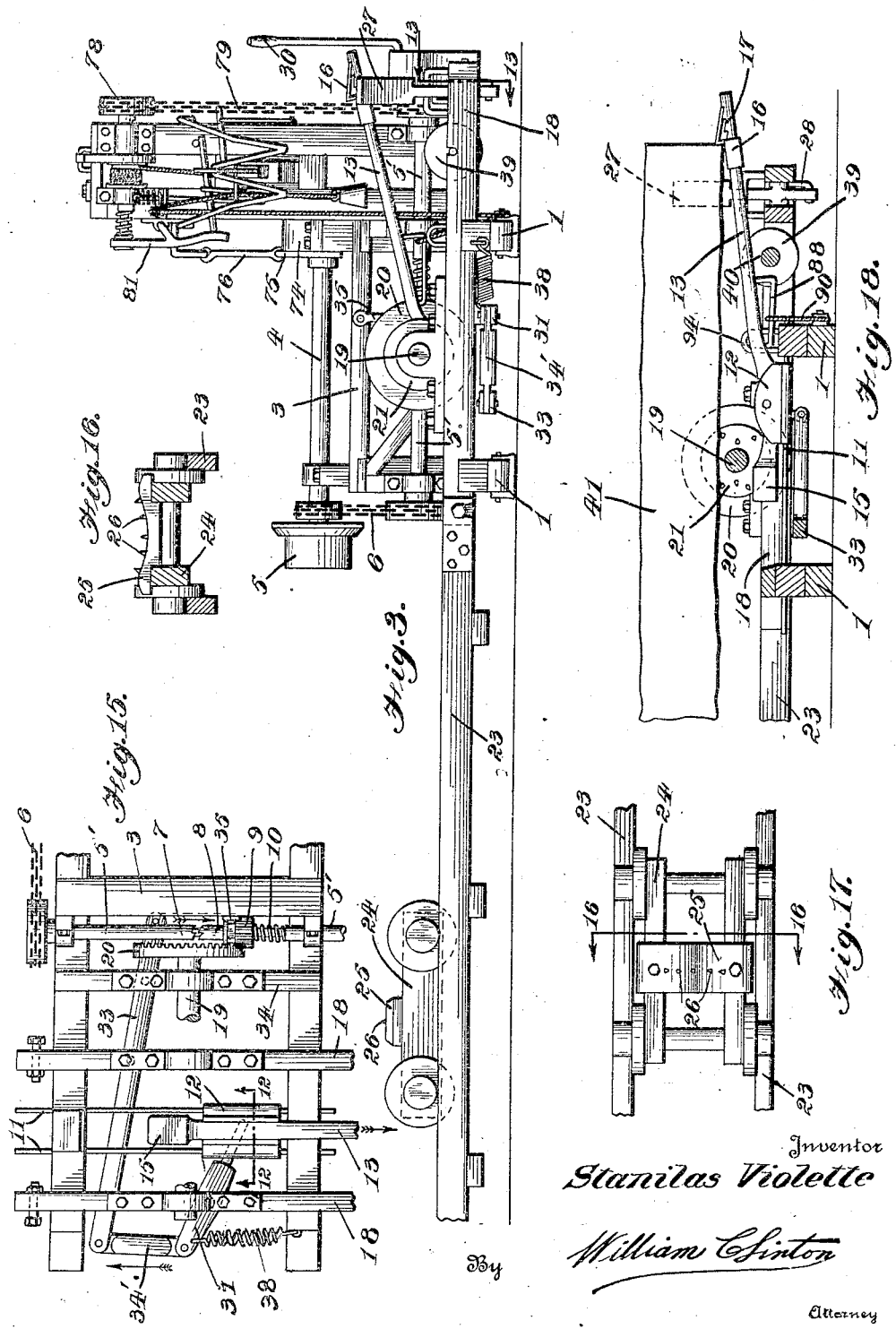

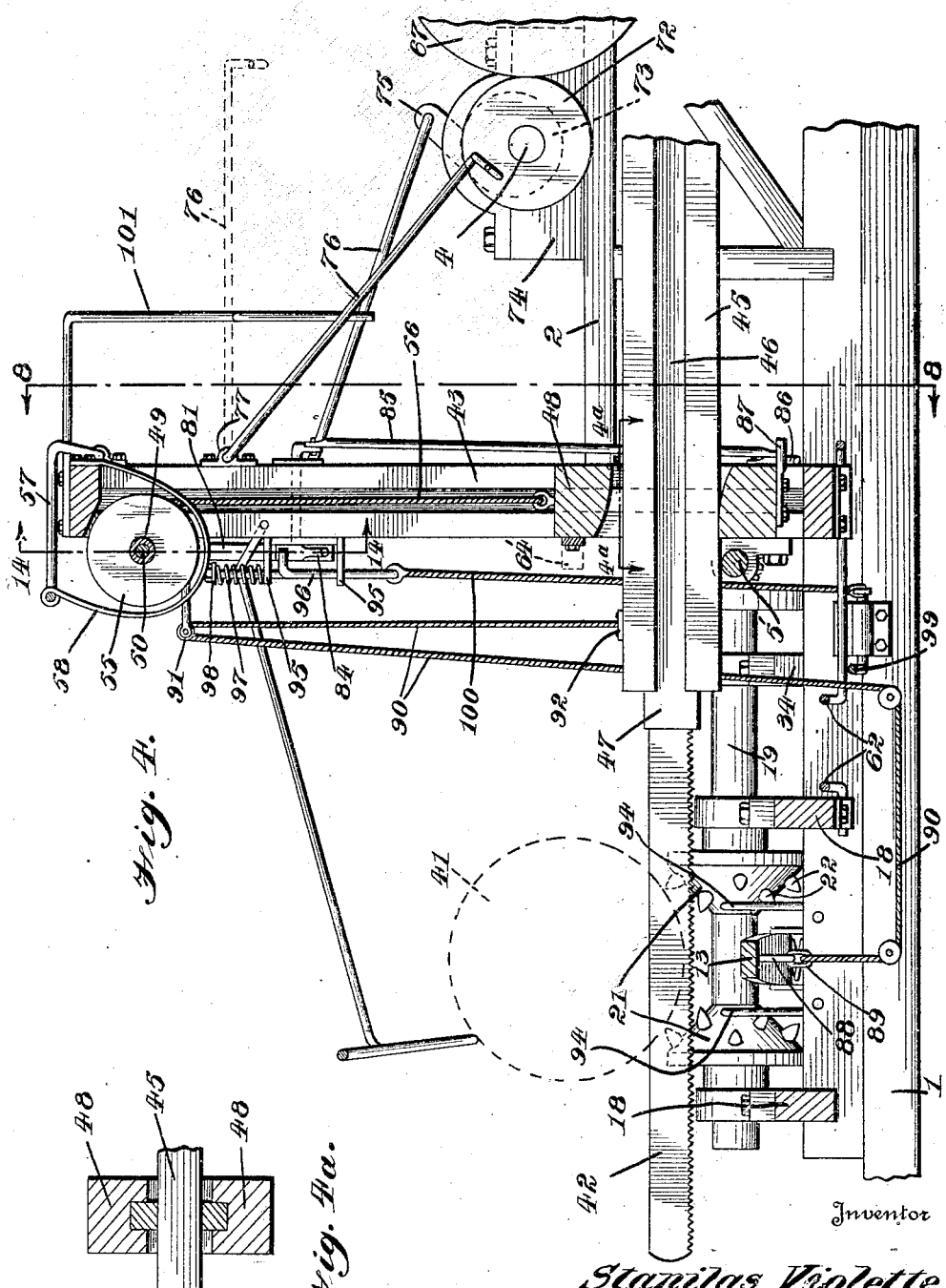

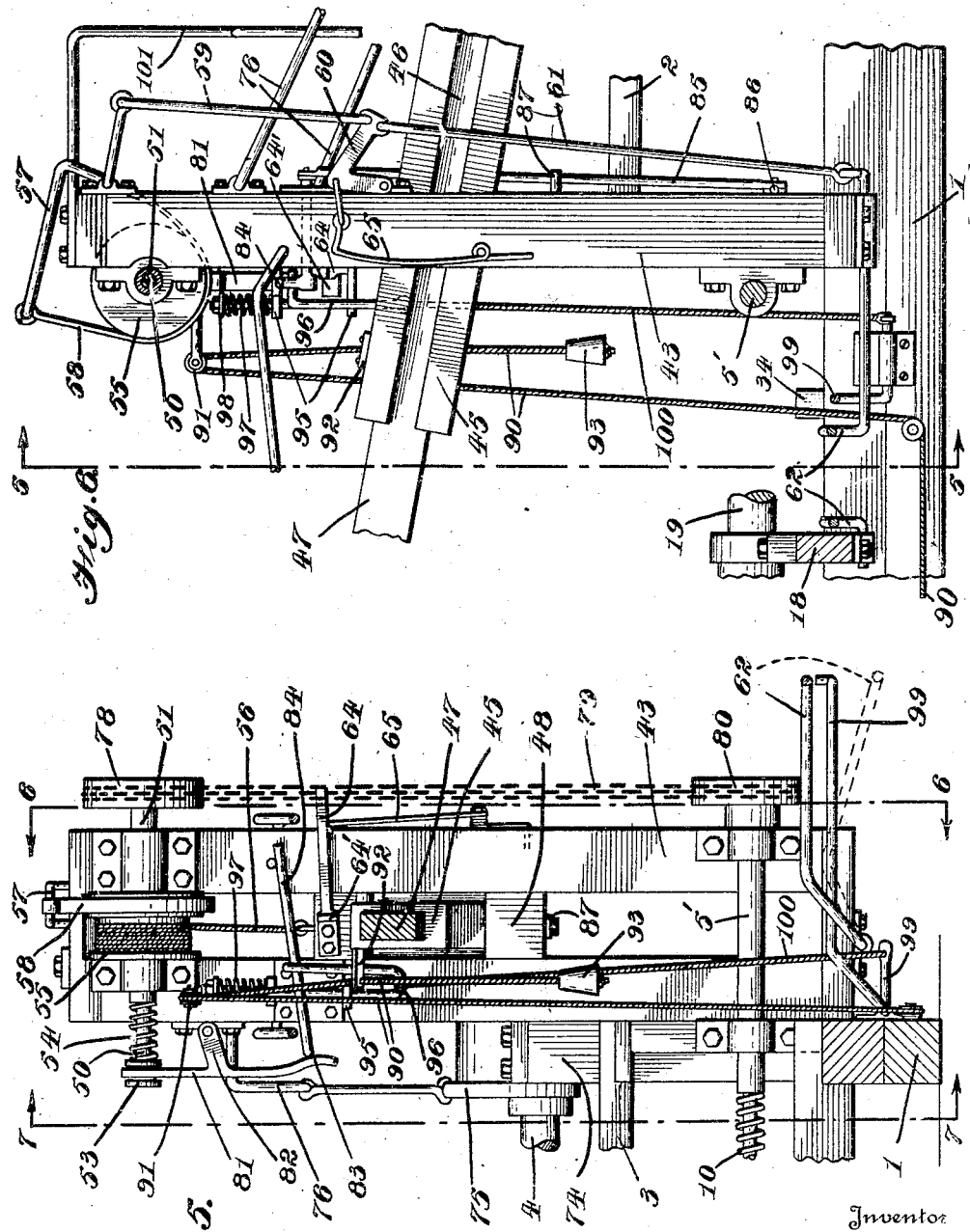

May 13, 1924.
S. VIOLETTE
1,493,831
AUTOMATIC SAWING MACHINE
Filed Nov. 18, 1922     6 Sheets-Sheet 6
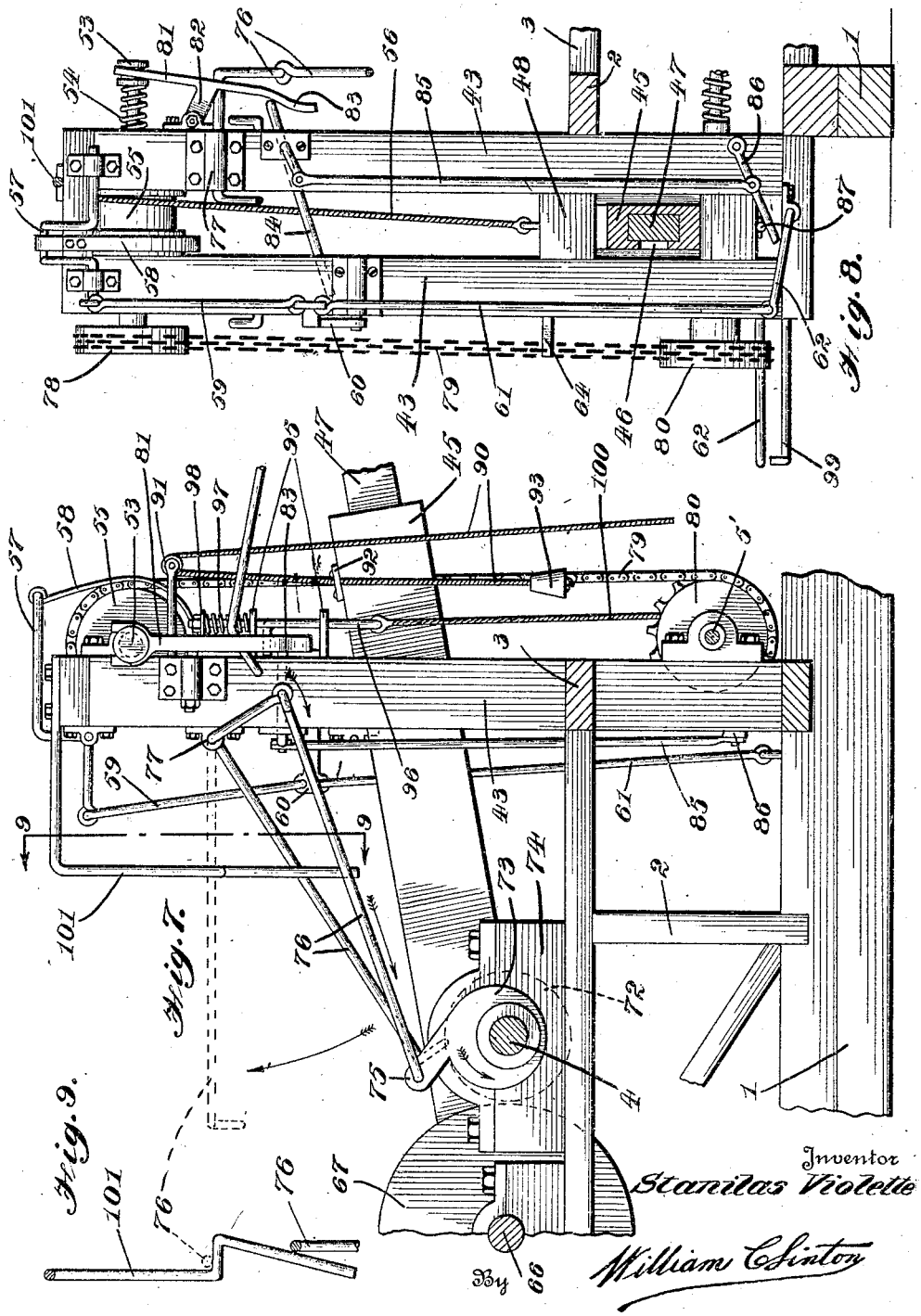
Inventor
Stanilas Violette
By William C Sinton
Attorney

Patented May 13, 1924.

1,493,831

UNITED STATES PATENT OFFICE.

STANISLAS VIOLETTE, OF ST. QUENTIN, NEW BRUNSWICK, CANADA.

AUTOMATIC SAWING MACHINE.

Application filed November 18, 1922. Serial No. 601,814.

*To all whom it may concern:*

Be it known that I, STANISLAS VIOLETTE, a subject of the King of Great Britain, and residing at St. Quentin, Co. Restigouche, New Brunswick, Canada, have invented certain new and useful Improvements in Automatic Sawing Machines; and I do hereby declare that the following is a full, clear, and exact description of the invention, such as will enable others skilled in the art to which it appertains to make and use the same.

The primary object of the invention is the provision of a sawing machine which is entirely automatic in its operation, from the feeding of the logs beneath the saw to the raising of the latter at the end of an operation. The log or material to be sawed rests upon a supporting strip which is actuated by means of a feed shaft. When the strip reaches the end of its stroke so that the log is in a stationary position to be sawed, a linkage is operated to disconnect the power from the feed shaft. The operator then actuates a treadle to release the saw from its elevated position, as a consequence of which the saw falls by gravity on to the log, being retarded in its drop by means of a brake. The falling of the saw in this manner operates a device which applies the power to the saw actuating mechanism.

When the saw blade has passed through the work, the saw support engages a trip member which causes the saw to be raised for a following operation. When the sawed-off piece is removed from the machine, the supporting strip is caused to retract, whereby the feed shaft is again set into movement for the beginning of another operation as above outlined.

The invention is fully disclosed in the following description and in the accompanying drawings in which:—

Figure 1 is a side elevation of the machine;

Figure 2 is a plan view;

Figure 3 is a front view;

Figure 4 is a section on the line 4—4 of Figure 2;

Figure 4ª is a section on the line 4ª—4ª of Figure 4;

Figure 5 is a fragmentary front elevation taken on the line 5—5 of Figure 6;

Figure 6 is a section on the line 6—6 of Figure 5;

Figure 7 is a section on the line 7—7 of Figure 5;

Figure 8 is a section on the line 8—8 of Figure 4;

Figure 9 is a section on the line 9—9 of Figure 7;

Figure 10 is a section on the line 10—10 of Figure 2;

Figure 11 is a section on the line 11—11 of Figure 10;

Figure 12 is a section on the line 12—12 of Figure 15;

Figure 13 is a section on the line 13—13 of Figure 3;

Figure 14 is a section on the line 14—14 of Figure 4;

Figure 15 is a fragmentary plan view showing the mechanism for controlling the log supporting strip;

Figure 16 is a section on the line 16—16 of Figure 17;

Figure 17 is a plan of Figure 16; and

Figure 18 is a section on the line 18—18 of Figure 2.

It will be seen from Figures 1 and 2 of the drawings that the frame of the machine includes a pair of spaced parallel runners 1 on each of which is mounted a side member 2 which members are connected at their ends by transverse wall members 3. The side members 2 are not co-extensive with the runners, leaving a space at the forward ends of the latter which constitutes the working platform. A power shaft 4 is journalled on the top of the side members and is provided at one end with a pulley 5 which is driven by a belt or other similar means. Near the lower edge of the forward end wall 3 is journalled a driven shaft 5' (Figs. 2, 11 and 15) which receives its power from the shaft 4 by the sprocket wheel and chain device indicated by the numeral 6 on Figure 2. This shaft has an enlarged portion 7 at the inner end of which is formed a clutch face 7'. A clutch member 8 is slidably carried on the smaller portion of the shaft and is provided at its inner end with a cooperating clutch face 7'' and carries a pinion 9 at the opposite end. A coil spring 10 surrounding the shaft 5' and bearing against the pinion tends to lock the clutch thus maintaining the pinion in working position. The forward portion of the runners carries a pair of transverse parallel guide members 11 along which a slide 12 is adapted to run. In the sides of the slide (Fig. 12) is pivoted a log supporting strip 13. One end of this strip is normally held in the raised position shown in Figure 1 by means of a spring 14 bearing against the strip at one side of the pivot. For the same purpose, the opposite end of the strip is weighted as at 15. The unweighted or forward end of the strip 13 carries an abutment 16 which is adjustable therealong in the notches 17, Figure 18.

The forward ends of the runners also support a base frame 18 in which is journalled a feeder shaft 19 carrying at its rear end a ring gear 20 adapted to mesh with the pinion 9. The intermediate portion of the shaft 19 carries a pair of conical members 21 provided with spikes 22. The rear end of the base frame 18 has hingedly and removably connected thereto a runway 23 on which travels a carriage 24. The seat 25 of the latter is also provided with spikes 26 the function of which is pointed out later. In the forward end of the base frame 18 is pivotally supported a pair of jaws 27 designed to clamp the forward end of a log supported on the strip 13 and the carriage 24. These jaws are connected by intersecting cross links 28 pivoted thereto one of which may be actuated by the leverage 29 associated with the working handle 30.

A medially fulcrumed lever 31 is pivoted to the forward side of the base frame 18 and is loosely connected to the lower portion of the slide 12 (Figs. 12 and 15) by means of the ring and spindle device 32. A second lever 33 having a long power arm is pivoted to a strip 34 adjacent the driven shaft 5'. The forward ends of these levers are pivotally connected to a link 34'. The inner end of the lever 33 has connection with the lower end of a substantially upright clutch shifter 35 (Figs. 10 and 11) the upper end of which is pivotally connected to the top of the forward end wall 3. At the intermediate portion of the shifter is formed a fork 36 which straddles the clutch member 8 and is adapted to engage the pinion 9 at one side and a collar 37 on the other side, the collar being formed on the periphery of the clutch member 8. The shifter piece normally holds the clutch in locked position by virtue of the return spring 38 connected to the outer or forward end of the lever 31 and to one of the runners 1. Slightly to the rear of the jaws 27, a guide roller 39 is journalled in the base 18 and is formed with a medial groove 40 for accommodating the strip 13.

In the operation of the parts thus far described, the feeder shaft 19 is driven from the power shaft 4, thus carrying the log 41 towards the abutment 16 above which is disposed a saw 42. When the log engages the abutment, as shown in Figure 18, the supporting strip is lowered into the groove 40 of the roller 39. The continued rotation of the feeder shaft pulls the strip forwardly, carrying the slide 12 in the same direction. The latter, through the medium of the linkage 31—34' causes the shifter 35 to open the clutch against the pressure of the spring 10, whereby the power is disconnected from the feeder shaft and the log is in stationary position ready to be sawed. The operator may then clamp the forward end of the log by actuating the handle 30, as already described.

Adjacent the forward end wall 3 and opposite the sprocket mechanism 6 is supported an upright guide member 43, while a supporting shaft 44 is journalled above the opposite end wall. On this shaft is loosely mounted one end of an arm 45 the opposite end of which is received within the upright guide and is internally grooved at 46 for the reception of the saw block 47 in which the blade 42 is secured. This end of the arm 45 passes loosely through a sliding member 48 which operates along the upright guide 43. The upper end of the guide has mounted therein a sleeve 49 through which passes a shaft 50, the latter carrying a clutch member 51 adapted for cooperation with the clutch face 52 on the end of the sleeve. One end of the shaft has formed thereon a small pulley 53 between which and the sleeve is disposed an expansion spring 54 which normally holds the clutch closed. The sleeve carries a drum 55 around which is wound a cable 56 which is joined to the upper part of the sliding member 48. A yoke 57 is secured to one end of a brake band 58 which is adapted to act on the drum 55. The yoke is pivoted at the upper end of the upright guide as shown in Figure 6, and is connected by means of a link 59 to a bell crank lever 60 also pivoted to the upright guide member. The member 60 is joined by means of a link 61 to a treadle 62 mounted at the base of the machine. The upper portion of the sliding member 48 carries a finger 64 which is adapted to cooperate with a spring detent 65 secured to the side of the upright member and operable from the bell crank 60 as shown in Figure 6. Therefore, when pressure is applied to the treadle, the detent is retracted from the position shown in Figure 1 to that shown in Figure 6 whereby the arm 45 may fall by its own weight carrying with it the saw blade; and the brake band 58 is at the same time applied to the drum 55 through the linkage 57—61.

A counter shaft 66 is journalled on top of the walls 2 slightly to the rear of the power shaft 4. The counter shaft carries at one end a wheel or gear 67 which has an eccentrically connected link 68 joined thereto, the latter being pivoted to an arm 69 fixed to the shaft 44. The latter shaft also carries a similar fixed arm 70 extending oppositely to the arm 69. A link 71 joins the outer end of the arm 70 to the saw block 47 from which it will be seen that when the wheel 67 is rotated a reciprocating motion is imparted to the saw blade 42.

The corresponding end of the power shaft carries a wheel or gear 72 adapted for engagement and disengagement with the wheel 67. The power shaft carries at a point adjacent the wheel 72 (Fig. 7) a loose eccentric block 73 resting in a bearing 74 for this end of the shaft. The member 73 is formed with an outwardly extending finger 75 to which is joined one end of a linkage 76, the intermediate portion of which is pivoted to the upright as at 77, while the other end rests on the arm 45 and follows the same. As the saw drops, the projection 75 is accordingly pulled toward the upright guide member as the result of which the wheel 72 is carried into engagement with the wheel 67; and the latter, receiving power from the power shaft, causes the saw blade to reciprocate.

The clutch member 51 (Figs. 5 and 14) carries a sprocket wheel 78 which is connected by means of a sprocket chain 79 to a similar sprocket wheel 80 secured to the end of the shaft 5 opposite the sprocket mechanism 6 above referred to. A shifter piece 81 engaging the pulley 53 has its intermediate portion 82 pivotally connected to the upright guide member, while its lower end is bent inwardly, as at 83. A finger 84 passes through the upright guide, being pivotally held therein (Fig. 8), and is adapted to abut the curved portion 83 to hold the clutch open as shown in Figure 14. The finger is connected by means of a link 85 to a small lever 86 pivoted on the lower portion of the upright guide. The lower portion of the sliding member 48 carries a pin 87 adapted to actuate the lever 86. When the saw and sliding block reach their lowermost position, the lever 86 is depressed by means of the pin 87 as shown in Figure 8, and the finger 84 is pulled out of engagement with the bent portion 83, as the consequence of which the spring 54 acts to close the clutch. The rotation of the clutch member 51 from the shaft 5' through the sprocket mechanism 78, 79, 80, becomes effective in turning the sleeve 49 and the drum 55 whereby the sliding member 48 and the saw are raised for the commencement of another operation.

The lower surface of the supporting strip 13 carries an eye 88 (Fig. 18) in which is adapted to travel a link 89 (Fig. 4). A cable 90 is connected to this link and passes along the lower portion of the frame and over a pulley 91 (Fig. 5) supported near the upper end of the upright guide 43. An eye 92 carried by the arm 45 surrounds the cable, and the lower end of the latter carries a weight or catch 93. As the arm 45 nears the lower end of the upright guide, the eye 92 engages the catch 93, and the supporting strip 13 is therefore pulled further downward so that the log rests on the support 94. The teeth of the saw may be watched as they pass through the lower edge of the log in order to prevent the supporting strip being cut. When the sawed-off section is removed from the supporting strip, the latter is no longer under the influence of the jaws 27 and the strip is free to retract by the action of the returned spring 38. This movement again applies the power to the feeder shaft 19 as already pointed out, and the log is consequently moved forward so that its forward end again engages the lip 16 on the strip. The machine now reaches the cycle above outlined.

The finger 64 has formed thereon a right angular end 64' which is adapted to strike the finger 84 when the sliding member 48 and arm 45 are raised. This movement brings the finger 84 again into engagement with the bent portion 83 whereby the clutch is again opened for the downward movement of the saw.

A pair of ears 95 are secured to the upright member and receive a hook 96 slidable therethrough. The latter is held normally in raised position by means of a spring 97 bearing against one of the ears 95 and against a collar 98 at the end of the shank. This hook is adapted to shift the finger 84 whenever desired, and is operable from a lever 99 pivoted at the base of the machine and connected to the hook by a flexible member 100. This device is used whenever it is desired to close the clutch 49—51 and raise the saw before the sawing operation is completed. When it is desired to disconnect the power from the wheel 67 for a considerable length of time, the end of the linkage 76 which rests on the arm 45 may be secured in elevated position by means of a hook or detent 101 secured to the upper part of the upright guide member (Fig. 4), thus turning the extension 75 towards the wheel 67 and moving the power shaft 4 away from the counter shaft 66.

While a specific embodiment of the invention has been illustrated and described, it is to be understood that various alterations in the details of construction may be made without departing from the spirit of the invention, as indicated by the appended claims.

Having thus fully described the invention, what I claim as new and desire to protect by Letters Patent is:—

1. A sawing machine comprising a frame, a vertically movable arm supported thereby, a saw carried by said arm, a slidable supporting strip disposed beneath the saw and adapted to engage the material to be sawed, a feed shaft adapted to carry the material to be sawed, a clutch controlling said feed shaft, an operative connection between said strip and clutch and means at the bottom of said frame and engageable by said arm for releasing said strip.

2. A sawing machine comprising a frame, a vertically movable arm supported thereby, a saw carried by said arm, a supporting strip for the material to be sawed, a feed shaft adapted to move the material to be sawed, a driven shaft, a clutch on said driven shaft, a trip mechanism connected to said strip and engageable by said arm, and an operative connection between said strip and clutch.

3. A sawing machine comprising a frame, a vertically movable arm supported thereby, a saw carried by said arm, a slidable strip for supporting the material to be sawed, a feed shaft for moving the material together with said strip, a driven shaft, a clutch on said driven shaft, cable connection between said strip and said arm, a catch carried by said cable and engageable by said arm, and an operative connection between said strip and said clutch.

4. A sawing machine comprising a frame, an upright guide associated therewith, a saw support movable in said guide, a saw secured to said support, a shaft mounted at the top of the guide, a drum rotatable with said shaft, a cable passing over the drum and connected to the saw support, a detent on said guide adapted to hold the saw support in raised position, a brake band associated with the drum, and means for simultaneously releasing the support and applying the brake band.

5. A sawing machine comprising a frame, an upright guide associated therewith, a saw support movable in said guide, a saw secured to said support, a shaft mounted at the top of the guide, a clutch member on said shaft, means for rotating said clutch, means for normally holding the clutch open, a drum rotatable with the shaft, a cable passing over the drum and connected to the saw support, a linkage adapted to release said last named means, said linkage extending to the lower portion of the guide and engageable by said support, and an independent device closing the clutch.

6. A sawing machine comprising a frame, an upright guide carried thereby, a sliding member movable in said guide, a saw support received in said sliding member, a saw secured to said support, a shaft mounted at the top of the guide, a clutch member on said shaft, means for rotating said clutch, means for normally holding said clutch open, a drum on the shaft, a cable passing over the drum and connected to the sliding member, a linkage adapted to release said last named means, said linkage extending to the lower portion of the guide and engageable by the sliding member, and a finger carried by the upper portion of the sliding member and adapted to engage said last named means on its upward stroke for again opening the clutch.

7. A sawing machine comprising a frame, an upright guide member supported thereby, a sliding member movable in said guide, a saw support extending through said sliding member, a saw secured to said support, a shaft mounted at the top of the guide, a clutch member on said shaft, means for rotating said clutch, means for normally holding said clutch open, a drum rotatable with the shaft, a cable passing over the drum and connected to the sliding member, a linkage adapted to release said last named means, said linkage extending to the lower portion of the guide and engageable by the sliding member, a detent on the guide member adapted to move the support in raised position, a finger carried by the sliding member and adapted to rest on said detent, said finger being in the path of said last named means and adapted to open the clutch at the end of the upward movement of the sliding member.

Signed at St. Quentin, in the Province of New Brunswick, Canada, this nineteenth day of February, 1924.

STANISLAS VIOLETTE.